United States Patent
Dinh

(10) Patent No.: US 11,392,141 B2
(45) Date of Patent: Jul. 19, 2022

(54) METHODS AND SYSTEMS FOR COORDINATING CARGO DELIVERY, PICK UP, AND TRANSPORTATION

(71) Applicant: United States Postal Service, Washington, DC (US)

(72) Inventor: Han Truong Dinh, Falls Church, VA (US)

(73) Assignee: United States Postal Service, Washington, DC (US)

( * ) Notice: Subject to any disclaimer, the term of this patent is extended or adjusted under 35 U.S.C. 154(b) by 228 days.

(21) Appl. No.: 16/746,606

(22) Filed: Jan. 17, 2020

(65) Prior Publication Data

US 2020/0233438 A1 Jul. 23, 2020

Related U.S. Application Data

(60) Provisional application No. 62/872,106, filed on Jul. 9, 2019, provisional application No. 62/793,788, filed on Jan. 17, 2019.

(51) Int. Cl.
| | |
|---|---|
| *G05D 1/02* | (2020.01) |
| *G06Q 10/08* | (2012.01) |
| *B60H 1/00* | (2006.01) |
| *G05D 1/10* | (2006.01) |

(52) U.S. Cl.
CPC ....... *G05D 1/0297* (2013.01); *B60H 1/00507* (2013.01); *G05D 1/104* (2013.01); *G06Q 10/0832* (2013.01)

(58) Field of Classification Search
CPC ........... B60D 1/24–665; G05D 1/0297; G05D 1/104; B60H 1/00507; G06Q 10/0832
See application file for complete search history.

(56) References Cited

U.S. PATENT DOCUMENTS

| | | | | |
|---|---|---|---|---|
| 2019/0302764 A1* | 10/2019 | Smith | ................ | B65G 69/2882 |
| 2019/0367107 A1* | 12/2019 | Grossman | ............ | G05D 1/0234 |
| 2020/0150686 A1* | 5/2020 | Wieschemann | ...... | G05D 1/0291 |

* cited by examiner

*Primary Examiner* — Aaron L Troost
(74) *Attorney, Agent, or Firm* — Knobbe Martens Olson & Bear, LLP

(57) ABSTRACT

Systems and methods for coordinating container transportation. A method of autonomously transporting a cargo container includes aligning a distribution vehicle with the cargo container. The distribution vehicle is aligned with and hitched to the cargo container. An attachment can be connected to the cargo container for mating systems of the cargo container with the distribution vehicle. A system has inputs for vehicle and container location, arrival and departure times, facility plans, and can coordinate the autonomous movement of containers in a facility or a yard.

11 Claims, 9 Drawing Sheets

METHODS AND SYSTEMS FOR COORDINATING CARGO DELIVERY, PICK UP, AND TRANSPORTATION

CROSS-REFERENCE TO RELATED APPLICATIONS

The present application claims priority benefit to U.S. provisional Application No. 62/793,788, filed Jan. 17, 2019 and titled METHODS AND SYSTEMS FOR COORDINATING CARGO DELIVERY, PICK UP, AND TRANSPORTATION and U.S. provisional Application No. 62/872,106, filed Jul. 9, 2019 and titled METHODS AND SYSTEMS FOR COORDINATING CARGO DELIVERY, PICK UP, AND TRANSPORTATION, each of which is incorporated by reference herein in its entirety for all purposes.

FIELD

This disclosure relates to dynamic coordination, scheduling, staging, routing, and placement of cargo and cargo delivery vehicles. More particularly, this disclosure relates to coordination and scheduling of transport, delivery, and pick up of cargo in an automated facility by automated vehicles with minimal user interaction and interface.

BACKGROUND

Automated driving is quickly becoming the focus of innovation. Many vehicle manufacturers and service providers are working to develop automated driving vehicles and systems for everyday consumer driving conditions. Many of these manufacturers and providers are investing in research and testing regarding automated driving on public streets and allowing for vehicles to automatically navigate themselves through an environment under various conditions. However, techniques of monitoring and coordinating automated vehicles in an automated fashion in cargo and distribution network contexts are needed.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features being described provide advantages that include data authentication services.

An aspect described herein includes a method of autonomously transporting a cargo container, the method comprising: aligning a distribution vehicle with the cargo container; hitching the distribution vehicle to the cargo container; positioning a connector fitting on the distribution vehicle for alignment with a mating receptacle on the cargo container; extending a mating mechanism comprising the connector fitting to the receptacle; coupling the connector fitting to the receptacle; and retracting the mating mechanism.

In some embodiments, the method further comprises: identifying one or more parameters of the cargo container; identifying a position of an air coupling on one or more surfaces of the cargo container; and positioning an air adaptor box on the one or more surfaces of the cargo container based on the position of the air coupling and the one or more parameters of the cargo container.

In another aspect described herein, a system for transporting a cargo container comprises a dispatch system comprising: a communication module; an autonomous transport vehicle, the autonomous transport vehicle comprising: a processor configured to control movement of the autonomous transport vehicle; a location circuit configured to determine the location of the autonomous transport vehicle at a facility; a communication circuit configured to receive movement instructions from the communication module; and an automatic cargo connection system; wherein the processor of the autonomous transport vehicle is configured to move the autonomous transport vehicle to a cargo container; move the cargo container to a dock at a facility based on instructions from the dispatch system.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
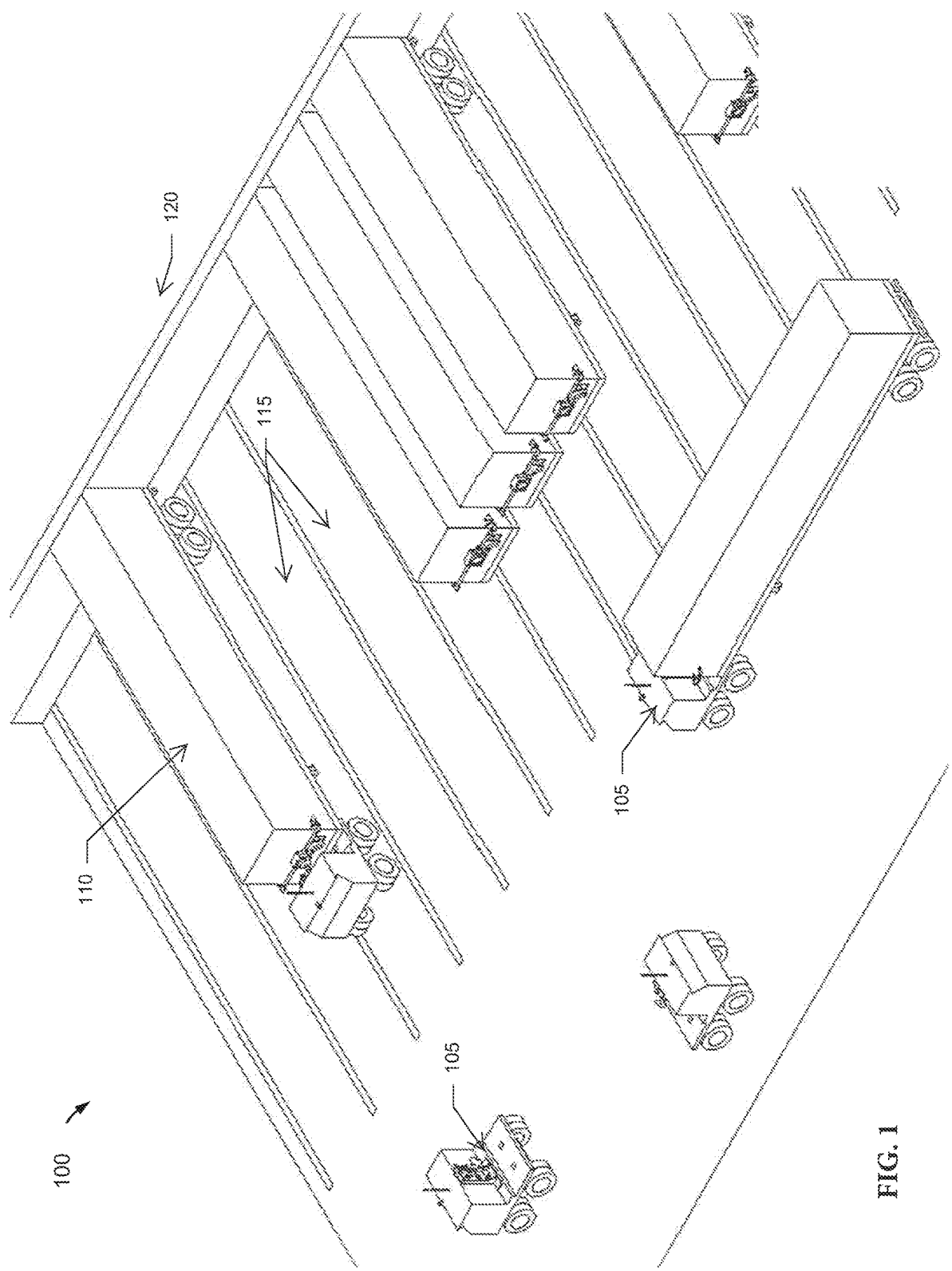
FIG. 1 is an overview diagram of a cargo facility using an automated cargo coordination system, in accordance with an exemplary implementation described herein.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Automated transportation may have many impacts on distribution facilities. For example, bulk mail and package facilities for mail and/or package distribution companies may coordinate hundreds of vehicle interactions each day. These interactions may include vehicles that arrive at or leave the cargo facility with items to be distributed and internal autonomous transport vehicles that move transport the items around the facilities themselves. In some instances, the facilities may receive vehicles (e.g., delivery or autonomous transport vehicles) that deliver mail or packages to the facility or dispatch vehicles that deliver mail or packages from the facility to another facility. Each of these vehicles that are received or dispatched may transport cargo containers that contain the mail or packages being delivered. Additionally, the autonomous transport vehicles may also transport cargo containers, such as trailers, around the facility.

When these internal transport vehicles are automated (e.g., configured to drive without human operators in the vehicles), the coordination and handling of the vehicles transporting the cargo containers may also be automated. For example, a receiving or dispatching area of the facility may be configured for travel by the automated vehicles. Various markers (e.g., retroreflective or radio, etc.) may be used to identify various positions, obstacles, etc., to allow the automated vehicles to maneuver within the area and move or deliver the cargo containers for processing at the facility or pick up the cargo containers for transport to another facility. In some embodiments, the automated vehicles include cameras, global positioning systems, Wi-Fi, cellular networks, triangulation systems, and/or other sensors or systems that allow the automated vehicles to maneuver about the cargo facility and corresponding areas without special markings, tags, etc.

When the automated vehicles drop off cargo containers, trailers, or other similar transports, these cargo containers may be prepared for transportation internally within the facility. For example, the cargo containers that are received at the facility may be prepared for hitching to the local autonomous transport vehicles (automated or otherwise) of the cargo facility. Hitching is the operation of physically coupling the cargo container to the autonomous transport vehicle and may include electrical, hydraulic, and/or pneumatic connections between the cargo container and the autonomous transport vehicle. In some embodiments, one or more of the hitching preparation of the cargo containers or hitching the cargo containers to the autonomous transport vehicles is automated. In some embodiments, the autonomous transport vehicles that transport the cargo containers about the facility may be standardized (e.g., have the same or similar dimensions) such that the connections between the cargo containers and the autonomous transport vehicles can be standardized or genericized.

Hitching preparation for the cargo containers may occur at a particular location (e.g., a hitching location) within the cargo facility. The hitching preparation may include temporarily or permanently placing an air adapter box on the cargo container to facilitate the coupling of electrical and/or pneumatic connections between the cargo container and the autonomous transport vehicles. In some embodiments, the hitching preparation may be fully or partially automated. The hitching preparation may also include receiving the cargo container at the hitching location. At this hitching location (or before arriving at the hitching location), the cargo container may be analyzed to identify various parameters of the cargo container. In some embodiments, this analysis of the cargo container may be performed when the cargo container is initially received at the cargo facility. The analysis of the cargo container may include, for example, determining dimensions of the cargo container, identifying an existing air adapter box installed on the cargo container, and determining a location of electrical and/or pneumatic connections for the cargo container. If the analysis occurs at the hitching location, then the analysis may also include determining a position of the cargo container in relation to an air adapter box placement device. The position of the cargo container in relation to the placement device may facilitate automated installation of the air adapter box on the cargo container, as will be further discussed herein. If the analysis of the cargo container does not occur at the hitching location, then the position of the cargo container in relation to the placement device may be separately determined once the cargo container is received at the hitching location.

The placement device may be used to couple the air adapter box and/or other components or connections to the cargo container. In some embodiments, as disclosed herein, such coupling may include connecting the air adapter box to electrical and/or pneumatic connectors on the cargo container. In some embodiments, such a connection may be manually completed or automated. Once the air adapter box is coupled to the cargo container, the air adapter box may be permanently installed or may be removed when the cargo container is transported from the cargo facility (e.g., when the cargo container is leaving the cargo facility).

In some embodiments, the autonomous transport vehicles may be automated. For example, in certain embodiments, the autonomous transport vehicles will be controlled by one or more computer systems that automatically coordinate traffic and routes of the autonomous transport vehicles (with or without cargo containers) with little or no human intervention. Thus, the computer system may track which cargo containers are being received at the facility, which are being dispatched from the facility, and which have been, are being, or will be transported around the facility. The computer system may also direct the automated autonomous transport vehicles as they maneuver around the facility.

In certain embodiments, the computer system that directs the automated autonomous transport vehicles also controls the automatic hitching of the automated autonomous transport vehicles with the cargo containers. For example, the automated autonomous transport vehicles may include a camera or other sensor that identifies a center of the cargo container and determines that when the center of the cargo container is aligned with a fork coupling (or fifth wheel) on the autonomous transport vehicle, a pin on the cargo container is aligned with the fork coupling. Thus, the automated autonomous transport vehicles may be controlled, via the computer system, to automatically hitch to the cargo containers. Furthermore, as described in more detail herein, once the automated autonomous transport vehicles are hitched to the cargo containers, the air, electrical, and hydraulic connections between the two are made. For example, these connections may utilize one or more quick disconnection fittings.

FIG. 1 is an overview diagram of a cargo facility 100 using an automated cargo coordination system, in accordance with an exemplary implementation described herein. As shown, the cargo facility 100 includes two autonomous transport vehicles 105 and multiple cargo containers 110. The cargo facility 100 also includes multiple docks 115 at a facility or building 120 where the cargo containers 110 may be docked, parked, or placed while mail and/or packages are loaded into or unloaded from the cargo containers 110. The autonomous transport vehicles 105 may be configured to transport the cargo containers 110 around the cargo facility 100, including docking the cargo containers 110 with the building (e.g., parking the cargo containers 110 in the parking spaces 115). The autonomous transport vehicles 105 may be configured to autonomously transport the cargo containers 110 to different locations around the cargo facility 100 without assistance from drivers within the autonomous transport vehicles 105. In some embodiments, the autonomous transport vehicles 105 may have one or more connections to make with the cargo container 110 to allow proper operation and transportation of the cargo containers 110.

In certain embodiments, the cargo facility 100 may have an office or control area (not shown) where scheduling and coordination of the transportation of the cargo containers 110 by the autonomous transport vehicles 105 is performed. For example, a person or a control system in the office may coordinate receiving of cargo containers 110 at the cargo facility 100, transportation of the cargo containers 110 around the cargo facility 100 by, for example, the autonomous transport vehicles 105, and the transfer of the cargo containers 110 about the cargo facility 100.

In operation at the facility 120, the autonomous vehicle 105 is configured to record its position, to detect and avoid obstacles in its path, and has self-piloting capabilities. The autonomous vehicle 105 is in wireless communication with a dispatch system (not shown). The dispatch system records and monitors the location of each autonomous transport vehicle 105 in a yard at the facility 120 based on location systems onboard the autonomous transport vehicles 105 or external to the autonomous transport vehicles 105. The dispatch system also records and monitors the location of each cargo container 110 at the facility. This can be done using location sensors on the cargo containers 110 and/or using knowledge of where autonomous transport vehicles 105 put the cargo containers 110 or using the external location systems. In some embodiments, the location systems and/or sensors may comprise global positioning systems (GPS) or similar systems or sensors.

The dispatch system also records and monitors dock status, such as whether a dock is occupied or not occupied. The dispatch system records and monitors cargo container status, such as loaded, unloaded, in progress of being loaded or unloaded, dock location, cargo priority, destination information and the like. The dispatch system may also record and monitor staging location status, such as occupied or not occupied, where a staging location is a location where a cargo container may be staged in preparation for another activity (such as loading, and so forth). The staging location can be within a facility, at a dock, in a yard (such as a trailer yard) at a facility, outside a facilities boundaries at a given location, and the like. The dispatch system also receives communication regarding inbound and outbound cargo containers 110 and shipments.

The dispatch system also creates or receives a facility utilization plan, which includes an optimized or efficient utilization of docks, autonomous transport vehicles 105, cargo containers 110, and the like. The facility utilization plan includes shipment information, including the identity of items on the cargo containers 110 inbound for the facility 120, including cargo priority and the like, and information regarding when cargo containers 110 will arrive or depart the facility, and which area or dock the cargo container 110 will arrive to or depart from. When a cargo container 110 is inbound for the facility 120, the dispatch system instructs an autonomous vehicle 105 to meet/receive the cargo container 110 and deliver the cargo container 110 to a selected dock at the facility 120. In some embodiments, the dispatch system may instruct the autonomous vehicle 105 to meet the cargo container 110 at the hitching location after the cargo container 110 is prepared for hitching for delivery to the selected dock. In some embodiments, the dispatch system may identify a position of the cargo container 110 and instruct the autonomous vehicle 105 to pick up the cargo container 110 for transport to the selected dock or other location. In some embodiments, the dispatch system may instruct the autonomous vehicle 105 to deliver the cargo container 110 to the selected dock along a route. In some embodiments, the dispatch system may generate the route dynamically or in a predetermined fashion based on awareness of other traffic within the facility 120. In some embodiments, the dispatch system may instruct an autonomous transport vehicle 105 to move other cargo containers 110 to make room for an incoming load having certain characteristic, (for example, a high priority load, a priority service class, and the like). In some embodiments, the dispatch system instructs the autonomous transport vehicle 105 to move the cargo container to a staging area (not shown), to await an open dock.

The dispatch system can record, store, and monitor pairings between particular cargo containers 110 and the autonomous transport vehicles 105 to which they are coupled, and can track movement of the autonomous transport vehicles 105 around the yard, and can provide instructions in real-time regarding how to handle the cargo containers 110.

In order to allow the autonomous transport vehicles 105 to couple to the cargo containers 110, which can be large trailers, the autonomous transport vehicles 105 need a pneumatic and electrical connection apparatus.

Figure 2:
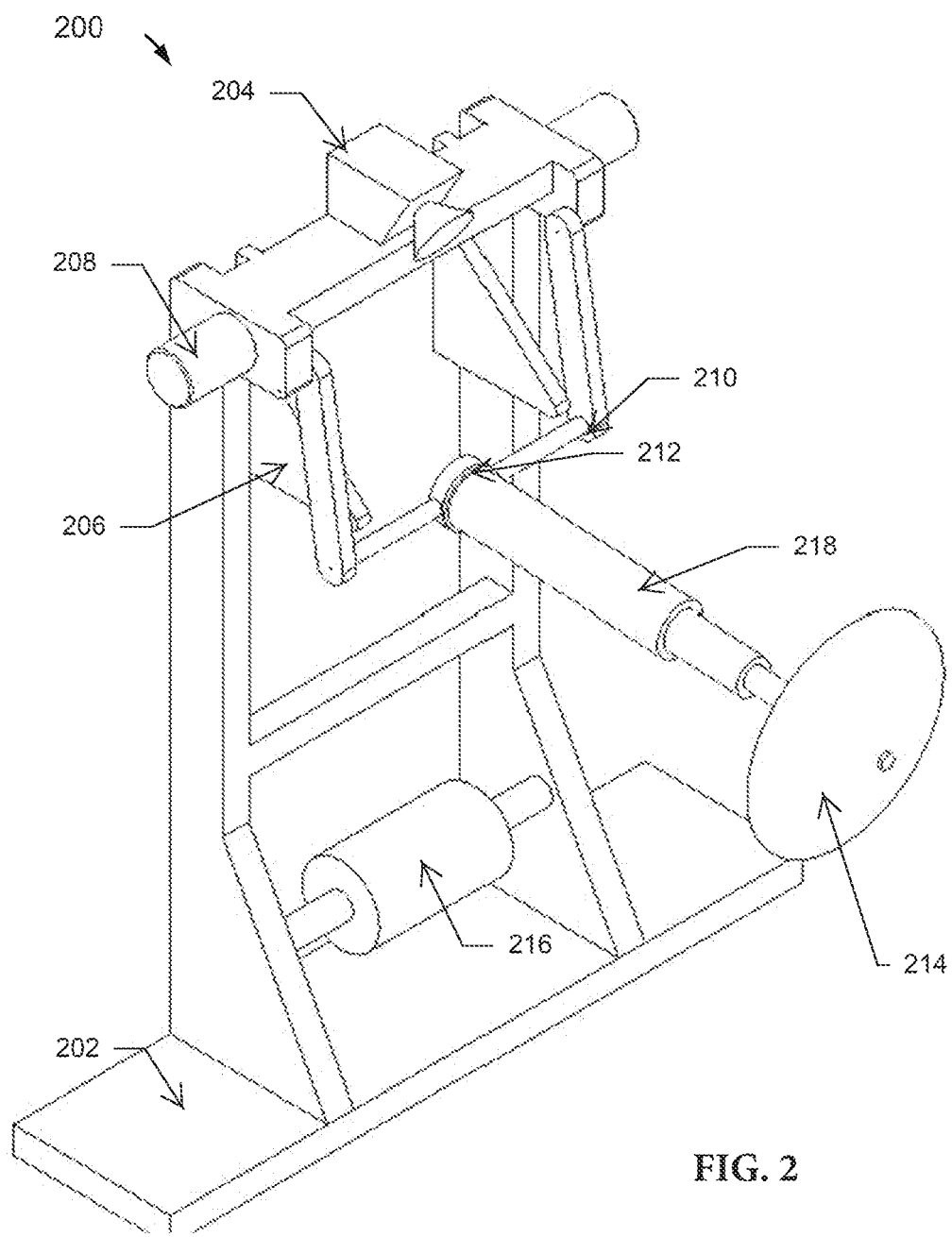
FIG. 2 shows a diagram of an air mechanism of an autonomous transport vehicle that couples to a cargo container, in accordance with an exemplary implementation described herein.

FIG. 2 shows a diagram of an air mechanism 200 of an autonomous transport vehicle 105 that couples to the cargo container 110 (e.g., via an air adaptor box, not shown in this figure), in accordance with an exemplary implementation described herein. As shown, the air mechanism 200 may be configured to provide air pressure/pneumatic force from the autonomous transport vehicle 105 to the cargo container 110 via the air adapter box of the cargo container 110, as described in more detail herein. In some embodiments, the air mechanism 200 may be coupled to a generator that creates air pressure (e.g., an air compressor, not shown) that is part of the autonomous transport vehicle 105. In some embodiments, the air mechanism 200 may be coupled to a tank (not shown) that is part of the autonomous transport vehicle 105 that stores internally or externally generated compressed air. The air mechanism 200 may include a frame 202, a camera 204, a swing cage 206, a cage motor 208, support mountings 210, an air adaptor holder 212, an air adaptor 214, a hose drum 216, and an air hose 218.

In some embodiments, the air mechanism 200 may include an electrical or similar coupling that allows for conveyance of an electrical signal from the autonomous transport vehicle 105 to the cargo container 110. For example, the air mechanism 200 may provide for a coupling that allows for activation and/or operation of one or more components of the cargo container 110 by the autonomous transport vehicle 105, such as brake lights, brake actuators, loading equipment, docking equipment, windows, environmental conditioning equipment, etc. In some embodiments, the air mechanism is configured such that the connection can be made automatically when mating the autonomous transport vehicle 105 with the cargo container without an operator being present.

In certain embodiments, additional mechanisms may be used to make electrical or other connections between the autonomous transport vehicle 105 and the cargo container 110. For example, an electrical mechanism (not shown) similar to the air mechanism 200 but intended to create the electrical connection between the autonomous transport vehicle 105 and the cargo container may be included on the autonomous transport vehicle 105.

The air mechanism 200 may include all components used to automatically connect an air supply from the autonomous transport vehicle 105 to the cargo container 110 via the air adaptor box. For example, the air mechanism 200 may physically connect an air supply (e.g., including the air adaptor 214 and the air hose 218) to the air adaptor box. In operation, the air mechanism 200 may extend the air adaptor holder 212 to mate the air adaptor 214 with the air adaptor box (see FIG. 3) and retract the air adaptor holder 212 leaving the air adaptor 214 mated with the air adaptor box. In certain embodiments, the air mechanism 200 may also automatically decouple the air adaptor 214 from the air adaptor box by extending the air adaptor holder 212 to attach to the air adaptor 214 and retract with air adaptor 214, decoupling it from the air adaptor box. In some embodiments, when the air flow through the air hose 218 and the air adaptor 214 is terminated (e.g., when the cargo container 110 is done being transported by the autonomous transport vehicle 105), the one or more locking mechanisms may be disengaged between the air adaptor 214 and the air adaptor box. Accordingly, the air mechanism 200 may include a control system (e.g., a controller, various sensors, etc.) that is not shown but that controls various operations by components of the air mechanism 200, such as a sensor and an automatic shutdown valve if the air connection is not made completely between the autonomous transport vehicle 105 and the cargo container 110, an indicator that the connection has been completed successfully, and the like. Such a control system may know to begin operation when the autonomous transport vehicle 105 is connecting or disconnecting (hitching or detaching) from the cargo container 110. Similarly, the air mechanism 200 (or a similar mechanism) may provide electrical or other connections between the autonomous transport vehicle 105 and the cargo container 110. In some embodiments, the control system of the air mechanism 200 may be configured to autonomously operate to couple the air mechanism 200 to the air adaptor box of the cargo container. In some embodiments, the control system of the air mechanism may be integrated with the dispatch system for integration with the facility utilization plan. Such integration may provide for autonomous operation of the autonomous transport vehicle 105 and the cargo containers 110, including autonomous connection, transport, and disconnection.

In some embodiments, the frame 202, or a similar mounting structure, provides for mounting and supporting components of the air mechanism 200 on the autonomous transport vehicle 105. In some embodiments, the frame 202 may be of sufficient height such that the various components of the air mechanism 200 are positioned at an appropriate height to couple with the air adapter box mounted to the cargo container 110. In certain embodiments, the frame 202 may have an adjustable height or may include one or more height adjustable portions that allow one or more components of the air mechanism 200 to move vertically in relation to the autonomous transport vehicle 105. For example, the height adjustable portions may utilize pneumatics, electronic actuators, or other similar components to allow for vertical actuation. In some embodiments, the frame 202 may be adjustable in a horizontal direction in relation to the plane of movement of the autonomous transport vehicle 105. In some embodiments, the frame 202 may support a structure that ensures the components of the air mechanism 200 are positioned at proper heights for coupling with the air adaptor box of the cargo container 110 or any corresponding components on the cargo container 110. In some embodiments, the autonomous transport vehicle 105 can receive input, from a sensor, a camera, or from a wireless communication device indicating the configuration of the cargo container 110. The air mechanism 200 may automatically adjust height, position, adaptor type, etc., in order to be compatible with the air system on the cargo container 110. In some embodiments, the controller may control the vertical or horizontal actuation of the frame 202 to help align the air adaptor 214 with the air adaptor box based on the input regarding the type of cargo container 110. The camera 204 can be positioned on the air mechanism 200 so as to observe the cargo container 110. The camera 204 can be an optical camera, and/or may be a sensor to receive a signal from the cargo container 110 which describes the type of cargo container 110. In some embodiments, the signal regarding the cargo container type 110 comes from a central processor which receives a signal from the cargo container 110 and communicates to the autonomous transport vehicle 105. In some embodiments, camera 204 can determine that the air adaptor box (FIG. 3) is lower or higher than the air adaptor 214, the controller may instruct one or more components to raise the frame 202 vertically to a proper height for alignment. Similarly, when the camera 204 determines that the air adaptor box and the air adaptor 214 are horizontally misaligned, the controller may instruct one or more components to move the frame 202 horizontally for proper for alignment.

The camera 204 may be used to identify the air adapter box of the cargo container 110 when the air mechanism 200 is intended to be coupled to the air adapter box in an automated system. For example, the camera 204 may be used to identify a specific positioning of the air adapter box to allow for appropriate positioning of the air mechanism to couple to the air adaptor box. In certain embodiments, the camera 204 may be coupled to the controller for the air mechanism 200 (not shown) that provides for automated control and coupling of the air mechanism 200 with the air adaptor box. In certain embodiments, the camera 204 may be coupled to a video monitor for viewing during alignment of the air mechanism 200 and the air adaptor box. In certain embodiments, the camera 204 may be replaced with or include a proximity sensor, a photodetector, an acoustic sensor, an ultrasonic sensor, or any other sensor that provides for detecting position or proximity information of one or more devices or objects, such as the air adaptor box.

The controller may be configured to receive an input from the camera 204 and determine, based on the input, whether the air adaptor box of the cargo container 110 is suitably located for coupling with the air mechanism 200. For example, the controller may receive a video stream input and may use that video stream input to determine when the air adaptor box is within a target or threshold reachable area for the air mechanism 200. Alternatively, or additionally, the controller may receive the input signaling that the air adaptor box is in the reachable area based on a determination by the camera 204 itself that analyzed its captured video. When the controller determines that the air adaptor box is within the reachable area, the controller may activate the air mechanism 200 to connect to the air adaptor box.

The swing cage 206 may provide actuation of one or more components of the air mechanism 200. The swing cage 206 may include various structural members that create an assembly or the cage that hold the components as they actuate. For example, the swing cage 206 may include vertical and horizontal structural members that form a cage that swings to provide movement for one or more components of the air mechanism 200 (e.g., the air hose 218 or the air adaptor 214) that are attached to the swing cage 206. The one or more components may couple to the air adaptor box and swing between the autonomous transport vehicle 105 and the cargo container 110 with the swing cage 206. For example, the swing cage 206 may move horizontally and/or vertically toward the cargo container 110 from the air mechanism 200. In some embodiments, the swing cage 206 may include one or more sensors to indicate a position of the swing cage 206.

The cage motor 208 may be coupled to the swing cage 206 and may provide motive or driving force to cause the swing cage 206 to actuate or swing between the autonomous transport vehicle 105 and the cargo container 110. In some embodiments, the cage motor 208 may be electronically or pneumatically driven. The cage motor 208 may receive a signal from the controller to begin operation, e.g., to extend to connect the air adaptor 214 to the air adaptor box or to extend to disconnect the air adaptor 214 from the air adaptor box. In some embodiments, the cage motor 208 as shown may generate rotational force to cause the swing cage 206 to swing into position around an axis driven by the cage motor 208. In certain embodiments, the cage motor may generate substantially linear force to cause the swing cage 206 to extend in a particular direction.

The support mountings 210 may comprise one or more mountings to which the adaptor holder 212 is attached. In some embodiments, the support mountings 210 may be flexible, malleable, or pliable to allow for movement by the adaptor holder 212 in any direction when the air adaptor 214 is being coupled to or decoupled from the air adaptor box. For example, when the controller determines that the air adaptor box is within the reachable area and extends the swing cage 206 to make the air adaptor 214 with the air adaptor box, the support mountings 210 may compress, etc., as necessary to allow for slight movement of the air adaptor 214 as it mates with and couples to the air adaptor box. Similarly, when extending to disconnect the air adaptor 214 from the air adaptor box, the support mountings 210 may compress, etc., to allow for proper connection of the adaptor holder 212 with the air adaptor 214.

The adaptor holder 212 may hold the air adaptor 214 when the air adaptor is not connected to the air adaptor box. In some embodiments, the adaptor holder 212 may include one or more physical components that hold the air adaptor 214 to the adaptor holder 212. In some embodiments, the adaptor holder 212 may simply be a portion of the swing cage 206 where the air adaptor 214 rests when not extended.

The air adaptor 214 may comprise a connector or fitting that is configured to engage with the air adaptor box on the cargo container 110. For example, as shown, the air adaptor 214 may be generally cone shaped and configured to fit into a recess in the air adaptor box of the cargo container 110, as will be described in greater detail below. In some embodiments, the air adaptor 214 may have a cylindrical, cube, or any other shape that generally matches the recess in the air adaptor box. The conical shape as shown (or other shape) may provide for slight movement of the air adaptor 214 in vertical and/or horizontal directions as it engages with the corresponding inverse cone recess of the air adaptor box to allow for slight variation in the alignment of the air mechanism 200 and the air adaptor box.

The hose drum 216 may be a storage location and device for a length of air hose 218. For example, the hose drum 216 may include approximately 10 feet of air hose 218 to allow the air adaptor 214 to be extended from the air mechanism 200 by at least 5 feet. In some embodiments, the hose drum 216 may store more or less length of air hose 218. In some embodiments, the hose drum 216 may automatically retract the air hose 218 when extended (e.g., like a spring-loaded coiling device).

The air hose 218 may convey air from the compressed air storage tank or generator (neither shown) to the air adaptor box when the air adaptor 214 is coupled to the air adaptor box.

In some embodiments, one or more components described herein may be adapted to provide for connection of other supplies between the autonomous transport vehicle 105 and the cargo container 110, e.g., electricity, hydraulics, etc.

Figure 3:
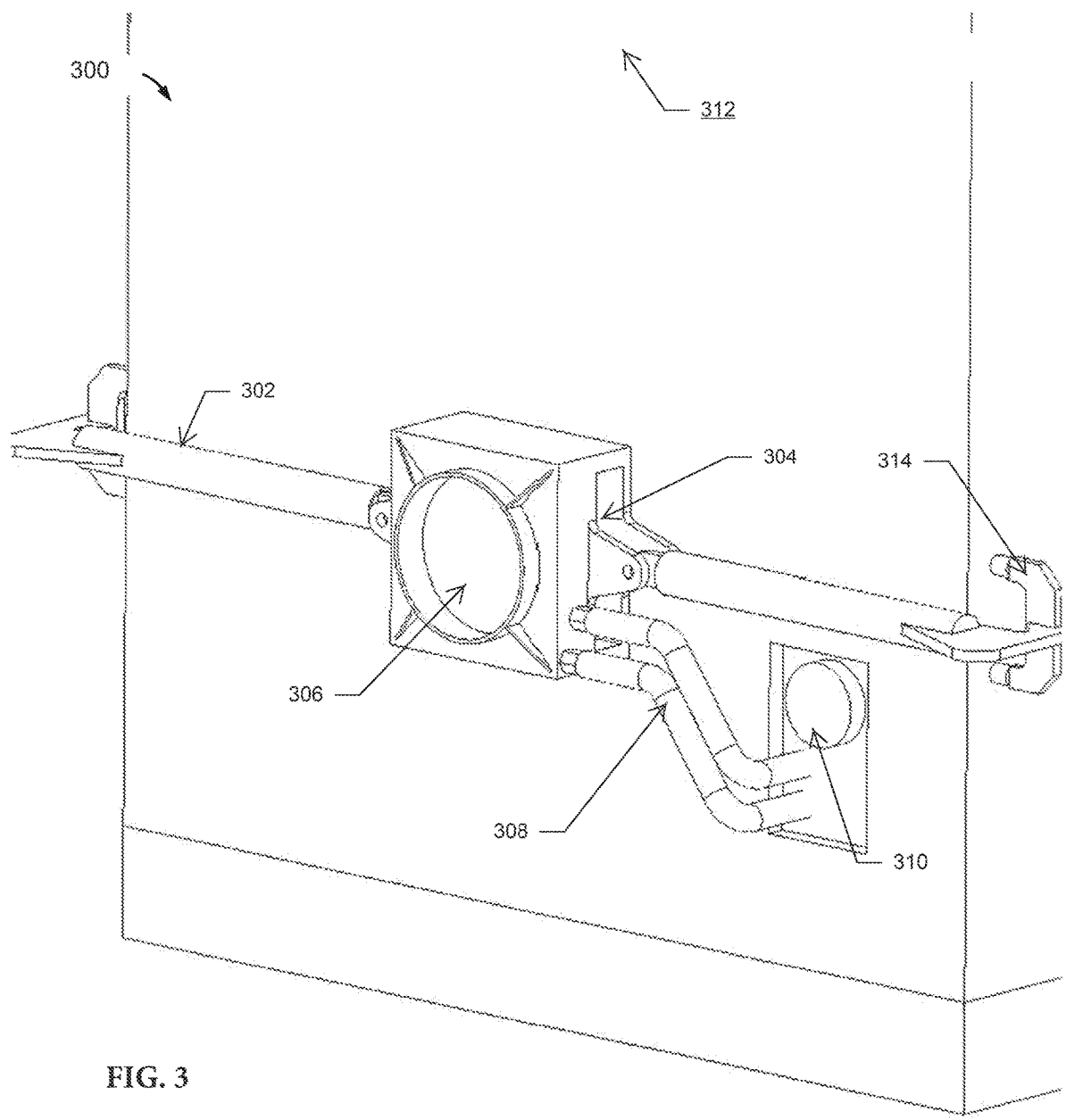
FIG. 3 shows a diagram of an air adapter box of the cargo container that is coupled to the autonomous transport vehicle of FIG. 2 for control of the cargo container by the autonomous transport vehicle, in accordance with an exemplary implementation described herein.

FIG. 3 shows a diagram of an air adapter box 300 of the cargo container 110 that is coupled to the air mechanism 200 of FIG. 2. disposed on the autonomous transport vehicle 105 for control of one or more aspects of the cargo container 110 by the autonomous transport vehicle 105, in accordance with an exemplary implementation described herein. The air adaptor box 300 may include various components, include a compression frame 302, a manual actuator 304 for the compression frame, a mating recess 306 for the air adaptor 214 of FIG. 2, air hoses 308 that convey air received from the air adaptor 214 and the air mechanism 200 to the cargo container 110, cargo container connections 310, a front face 312 of the cargo container 110, and lateral compression arms and pads 314.

As shown, the air adaptor box 300 may be configured to receive air pressure from the autonomous transport vehicle 105 at the cargo container 110, as described in more detail herein. In some embodiments, the air adaptor box 300 may be coupled to a tank that stores received air (not shown) at the cargo container 110.

In some embodiments, the air adaptor box 300 may include an electrical or similar coupling that allows for conveyance of an electrical signal from the autonomous transport vehicle 105 to the cargo container 110. For example, the air adaptor box 300 may provide for an electrical coupling that allows for activation and/or operation of one or more electronics of the cargo container 110 by the autonomous transport vehicle 105, such as brake lights, brake actuators, loading equipment, docking equipment, windows, environmental conditioning equipment, etc. In some embodiments, a separate electrical adaptor box (not shown) may be used for other connections between the cargo container 110 and the autonomous transport vehicle 105.

In certain embodiments, additional mechanisms may be used to make electrical or other connections between the autonomous transport vehicle 105 and the cargo container 110. For example, an electrical mechanism (not shown) similar to the air mechanism 200 but intended to create the electrical connection between the autonomous transport vehicle 105 and the cargo container may be included on the autonomous transport vehicle 105.

The compression frame 302 and the lateral compression arms and pads 314 may be used in conjunction to couple the air adaptor box 300 to the cargo container 110. The compression frame 302 and the lateral compression arms and pads 314 may hold the air adaptor box 300 to the front face 312 of the cargo container 110. The front face 312 of the cargo container 110 may be determined as being the face of the cargo container 110 nearest the autonomous transport vehicle 105 when the autonomous transport vehicle is transporting the cargo container 110.

The compression frame 302 and the lateral compression arms and pads 314 may provide for a compressive force on the cargo container 110 that prevents the various components of the compression frame from moving around on the front face 312 of the cargo container 110 once the air adaptor box 300 is installed or positioned on the front face 312 of the cargo container 110. As shown, the lateral compression arms and pads 314 may exert a force substantially horizontally on sides of the cargo container 110 adjacent to the front face 312. The compression frame 302 may help generate the compression on the lateral compression arms and pads 314 that generate the substantially horizontal force of the lateral compression arms and pads 314 on the sides of the cargo container 110.

The manual actuator 304 may comprise a handle and other actuator for adjusting the compression of the compression frame 302 and the lateral compression arms and pads 314. For example, the manual actuator 304 may increase or decrease the compression forces generated by the compression frame 302 on the lateral compression arms and pads 314. Accordingly, the air adaptor box 300 may be tightened or loosened on the front side 312 of the cargo container 110 manually by using the manual actuator 304.

The mating recess 306 may comprise a receptacle into which the air adaptor 214 extends for coupling. As shown, the mating recess 306 may comprise a concave cone shape when the air adaptor 214 comprises a cone shape. In some embodiments, the mating recess 306 may be slightly larger than the corresponding air adaptor 214 to provide some clearance if the air mechanism 200 and the air adaptor box 300 are not perfectly aligned. The mating recess 306 may have any shape that is gradually reducing in cross section to allow for ease of coupling and alignment of the air adaptor 214 with the mating recess 306 when the air mechanism 200 and the air adaptor box 300 are not perfectly aligned, so long as the shape generally matches a shape of the corresponding air adaptor 214 and is slightly larger than the corresponding air adaptor.

The air hoses 308 conveys the air received via the mating recess 306 to the cargo container connections 310. The cargo container connections 310 may comprise one or more valves, connections, and similar equipment to distribute the received air to various components or locations of the cargo container. For example, the cargo container connections 310 may couple the air hoses 308 with the brakes of the cargo container 110 or other pneumatic components of the cargo container 110.

In some embodiments, one or more components described herein may be adapted to provide for connector of other supplies between the autonomous transport vehicle 105 and the cargo container 110, e.g., electricity, hydraulics, etc.

Figure 4:
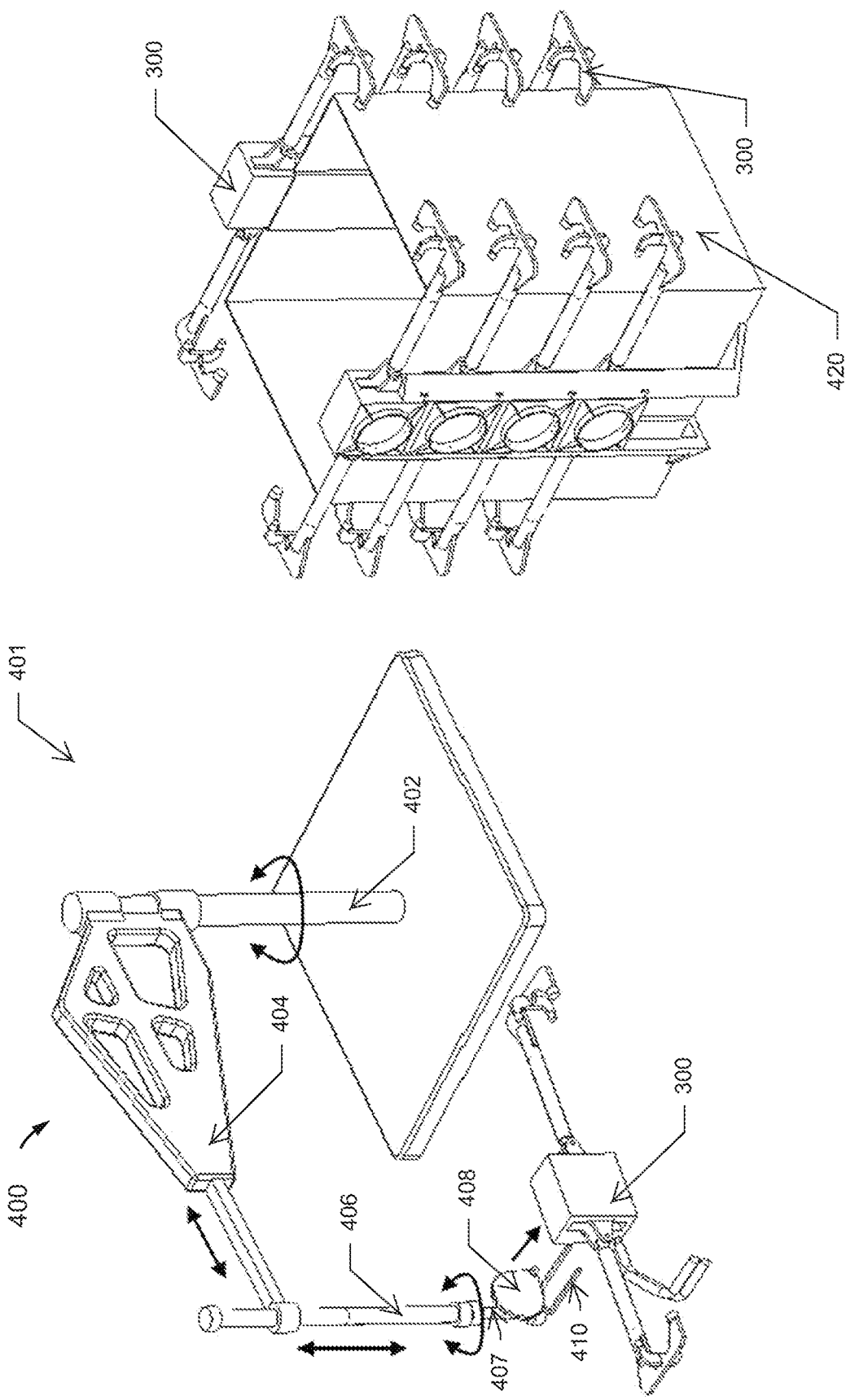
FIG. 4 shows a diagram of a mounting system configured to couple the air adapter box of FIG. 3 to the cargo container, in accordance with an exemplary implementation described herein.

FIG. 4 shows a diagram of a mounting system 400 configured to couple the air adapter box 300 of FIG. 3 to the cargo container 110, in accordance with an exemplary implementation described herein. The mounting system 400 includes adaptor placement gallows 401 and an adaptor storage 420. The adaptor placement gallows 401 may include a vertical portion 402 that attaches the gallows 401 to the ground or to a base. In some embodiments, the vertical portion 402 may rotate to allow the gallows 401 to rotate about the ground or base where the vertical portion 402 is attached. The gallows further include a horizontal portion 404. The horizontal portion 404 may extend or retract (e.g., making the horizontal portion 404 longer or shorter). In some embodiments, where the entire vertical portion 402 does not rotate, the horizontal portion 404 may rotate about the vertical portion 402. The gallows 401 further includes a second vertical portion 406. The second vertical portion 406 may move up or down. At a bottom of the second vertical portion 406, the gallows 401 include an air adaptor box holder section 407. The holder section 407 includes an air adaptor holder 408 and a box holder 410. The holder section 407 may be configured to rotate about the second vertical portion 406. The air adaptor holder 408 may comprise a protrusion that extends into the mating recess 306 of the air adaptor box 300. The box holder 410 may comprise a fork or hook-like device that support the air adaptor box 300 along a bottom surface. In combination, the air adaptor holder 408 and the box holder 410 allow the holder section 407 to support the air adaptor box 300 while being manipulated on the gallows 401. In some embodiments, only one of the air adaptor holder 408 or the box holder 410 may be incorporated with the gallows 401. The adaptor storage 420 may comprise a rack or shelving capable of storing multiple air adaptor boxes 300 for access by the gallows 401. Accordingly, the adaptor storage 420 may be located or positioned within reach of the gallows 401.

The gallows 401 may be used to position the air adaptor box 300 on cargo containers 110 that are to be transported by the autonomous transport vehicle 105. For example, a shipper may put items on a cargo container 110 owned and/or operated by a third party, or by an entity not operated by the distribution network. In this case, the cargo container 110 may not have an air adaptor box 300 thereon, and the cargo container 110 would be incompatible for use in the yard of the facility 120, and to connect to the autonomous transport vehicle 105. In this case, cargo containers 110 that are received at the cargo facility 100 that do not have a compatible air adaptor box 300 coupled thereto may have one installed thereto by the mounting system 400 to enable automated transportation by the autonomous transport vehicle 105. Similarly, the gallows 401 may be used to remove the air adaptor box 300 from cargo containers 110 that are leaving the cargo facility 100 (e.g., after being transported by the autonomous transport vehicle 105).

In operation, when positioning the air adaptor box 300 on the cargo container 110, the gallows 401 may obtain the air adaptor box 300 from the adaptor storage 420. For example, the gallows 401 may swing over to the air adaptor box 300 (the vertical portion 402, the second vertical portion 406, and the holder portion 407 rotating as needed to allow alignment of the air adaptor holder 408 and the box holder 410 with the air adaptor box 300. Similarly, the horizontal portion 404 and the second vertical portion 406 may extend or retract (or move up/down) as needed to allow the holder portion 407 to reach the adaptor storage 420. The holder portion 407 may pick up the air adaptor box 300 by having the second vertical portion 406 retract slightly (move up slightly) (for example, when the air adaptor box 300 rests on a shelf or the rack). Once the holder portion 407 has the air adaptor box 300 for installation, the gallows 401 may rotate and extend the various portions to position the air adaptor box 300 along the front face 312 of the cargo container 110. Once positioned along the front face 312 of the cargo container 110, the gallows 401 may move vertically or horizontally to properly position the air adaptor box 300 for access and coupling by the air mechanism 200 of the autonomous transport vehicle 105.

In certain embodiments, the parameters of a cargo container 110 obtained when the cargo container 110 is analyzed may be used to determine how the gallows 401 should be manipulated to place the air adaptor box 300 on the cargo container 110. For example, the height of the cargo container 110 may be a determining factor as to where the air adaptor box 300 is positioned on the cargo container 110. According to the height of the cargo container 110 and a vertical range of the air mechanism 200, the gallows 401 may place the air adaptor box 110 at a location/position on the front face 312 of the cargo container that is accessible by the air mechanism 200 and stable or workable in view of the dimensions of the cargo container 110. In some embodiments, the gallows 401 may include one or more mechanisms that may cause the compression frame 302 and the lateral compression arms 314 to expand or retract to place force on the cargo container 110 and hold the air adaptor box 300 onto the cargo container 110.

In certain embodiments, the vertical portion 402 may allow the gallows 401 to rotate about the base and provide access to various locations (e.g., potential parking spots for cargo containers that are being prepared for hitching to the autonomous transport vehicles 105 and the adaptor storage 420). Furthermore, the extendable/retractable horizontal portion 404 may further provide the gallows 401 with access to the various locations. Additionally, the extendable/retractable horizontal support 404 may also allow the gallows 401 to accommodate cargo containers 110 of various widths. The vertically adjustable second vertical portion 406 may provide for height manipulation and/or adjustment when placing the air adaptor box 300 on the front face 312 of the cargo container 110. Accordingly, the gallows 401 may accommodate cargo containers 110 of various heights. Finally, the holder section 407 may rotate to allow the gallows 401 to place the air adaptor box 300 on the front face 312 of the cargo container 110 regardless of an orientation of the cargo container 110. For example, the cargo container 110 may not be positioned in its parking spot with an orientation that is perpendicular to the horizontal support 404. Accordingly, the holder portion 407 may be rotated to accommodate any slight orientation offset of the cargo container 110.

In certain embodiments, the gallows 401 may be controlled via a controller, computer, or control system (including a controller, various sensors, and so forth) that is not shown but that control various operations of components of the gallows 401. Such a control system may know to begin operation when the cargo container 110 is detected within a particular area or region or within reach of the gallows 401.

Accordingly, the various sections may include one or more motors, sensors, and/or control devices that allow the controller to control the gallows 401. Additionally, the gallows 401 may include one or more cameras or sensors that allow for viewing and/or detection of various objects, etc. For example, the cameras or sensors may be used to detect a position of the cargo container connections 310 to ensure that the air adaptor box 300 is being positioned along the front face 312 of the cargo container within reach of the air hoses 308 and the cargo container connections 310. The controller may use the camera or sensors, along with the parameters of the cargo container 110 and the air mechanism 200 to automatically place the air adaptor box 300 on the cargo container 110 where it is accessible by the air mechanism 200 when the autonomous transport vehicle 105 hitches to the cargo container 110. As the air adapter box 300 is installed on the cargo container 110, the air hoses 308 can connect to the cargo container connections 310 via a quick disconnect type fitting or other type of fitting and can be automatically aligned and attached. In some embodiments, automated removal can be facilitated by a mechanism on the holder section 407 which disengages the lock mechanism on the quick-disconnect type fittings.

Figure 5:
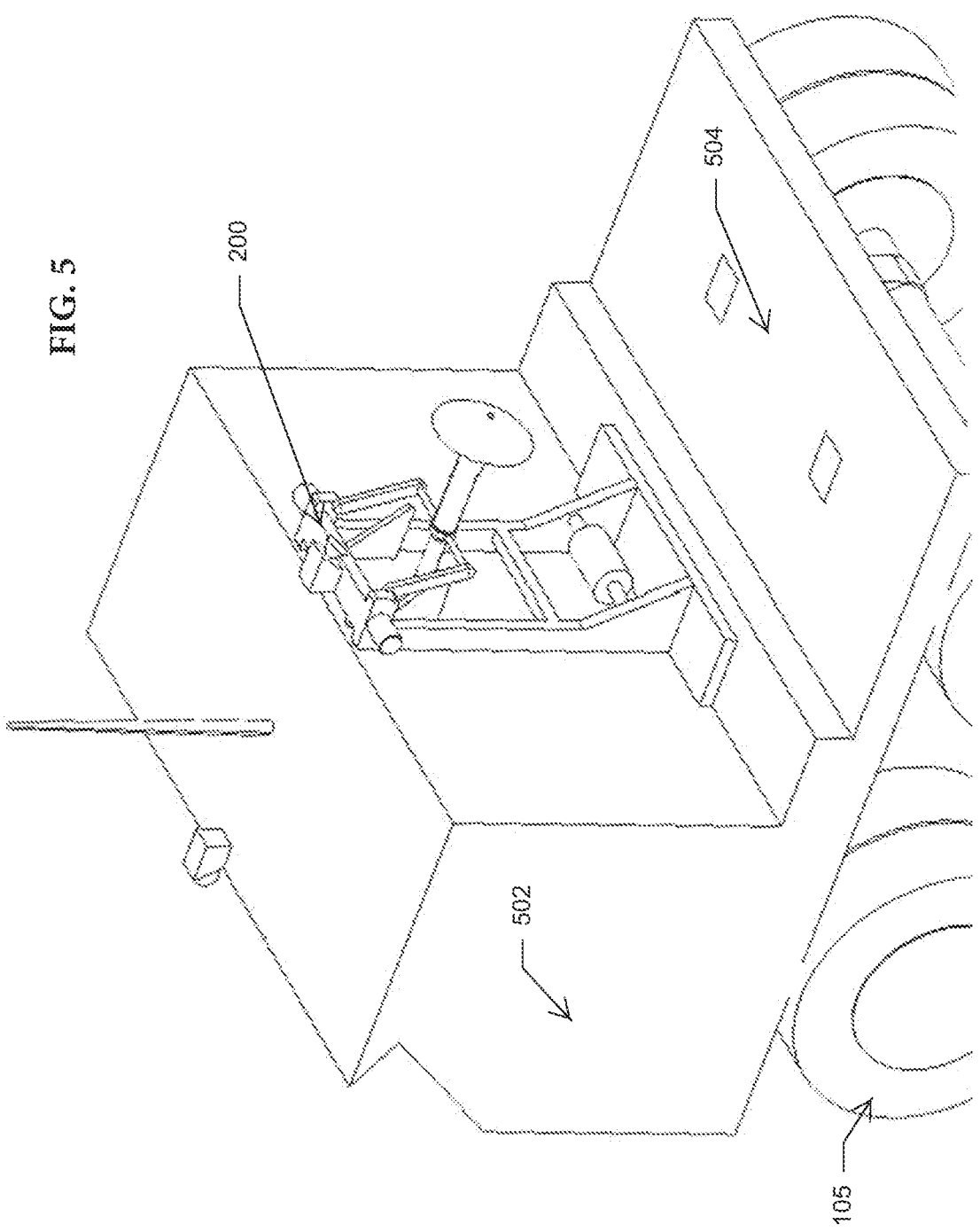
FIG. 5 shows a diagram of how the air mechanism of FIG. 2 is attached to the autonomous transport vehicle, in accordance with an exemplary implementation described herein.

FIG. 5 shows a diagram of how the air mechanism 200 of FIG. 2 is attached to the autonomous transport vehicle 105, in accordance with an exemplary implementation described herein. As depicted, the air mechanism 200 may be positioned on the autonomous transport vehicle 105 behind a cab area 502 of the autonomous transport vehicle 105. In some embodiments, as noted above, the air mechanism 200 may receive air (e.g., compressed air) from a generator or from a storage tank (not shown) that is positioned on the autonomous transport vehicle 105. The air mechanism 200 may be positioned with the air adaptor 214 facing toward a hitch 504 of the autonomous transport vehicle 105. The hitch 504 may be the portion autonomous transport vehicle 105 that couples to the cargo container 110 and allows the autonomous transport vehicle 105 to physically move the cargo container 110.

Figure 6:
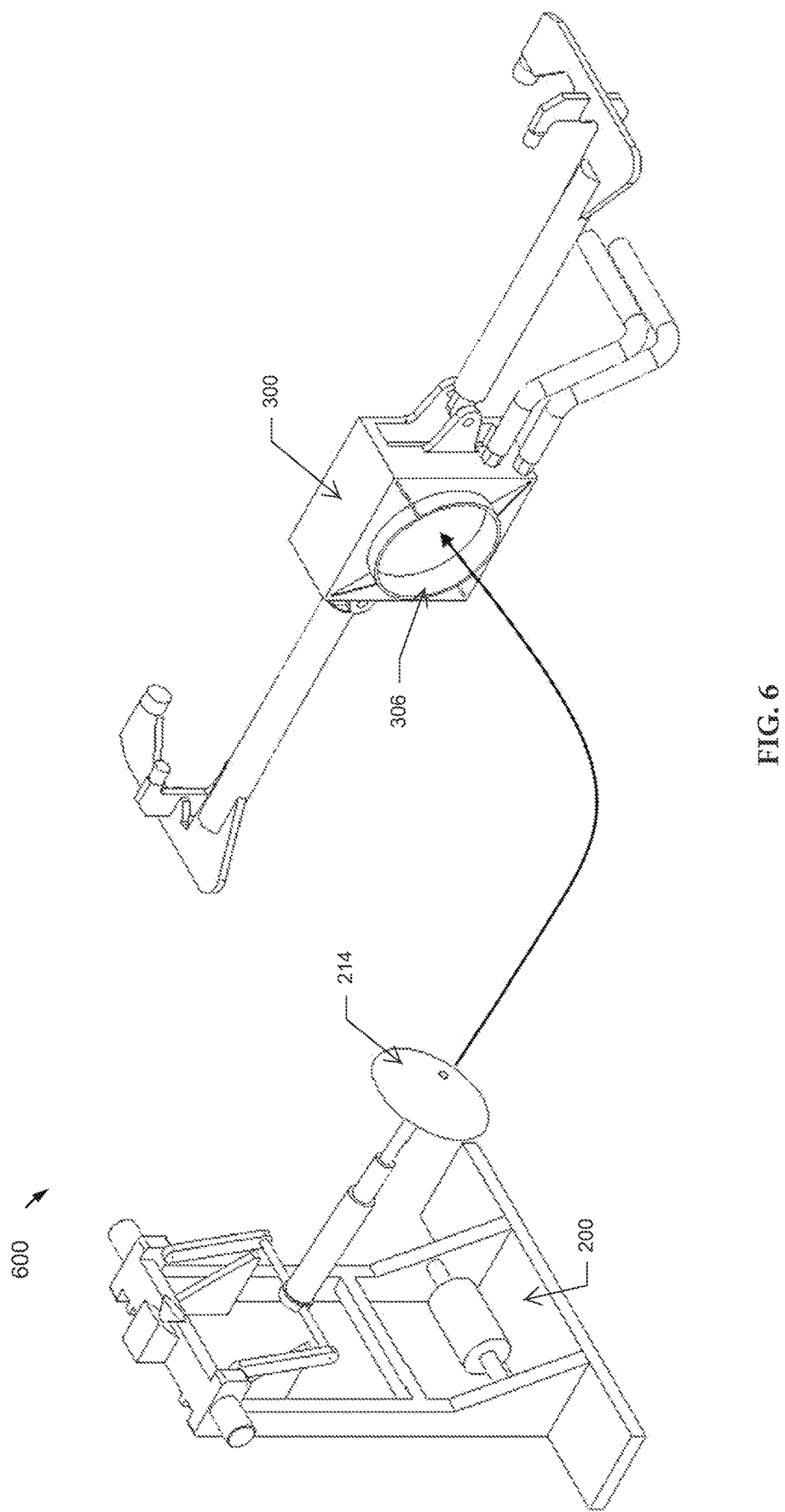
FIG. 6 shows a diagram of how the air mechanism of FIG. 2 couples to the air adapter box of FIG. 3, in accordance with an exemplary implementation described herein.

FIG. 6 shows a diagram of how the air mechanism 200 of FIG. 2 couples to the air adapter box 300 of FIG. 3, in accordance with an exemplary implementation described herein. More specifically, FIG. 6 shows the air adaptor 214 extended from the air mechanism 200 with air hose 218 stretched between air adaptor 214 and the air mechanism 200. As shown, the air adaptor 214 may fit into the mating recess 306 of the air adaptor box 300. In some embodiments, the air adaptor 214 may include a nozzle 602 that, when the air adaptor 214 is mated with the mating recess 306, extends into an inlet 604 in the mating recess 306. Thus, the air from the air mechanism 200 may flow through the air hose 218, through the air adaptor 214, out the nozzle 602 and into the air inlet 604 to be fed to the cargo container 110 via the components described herein.

Figure 7:
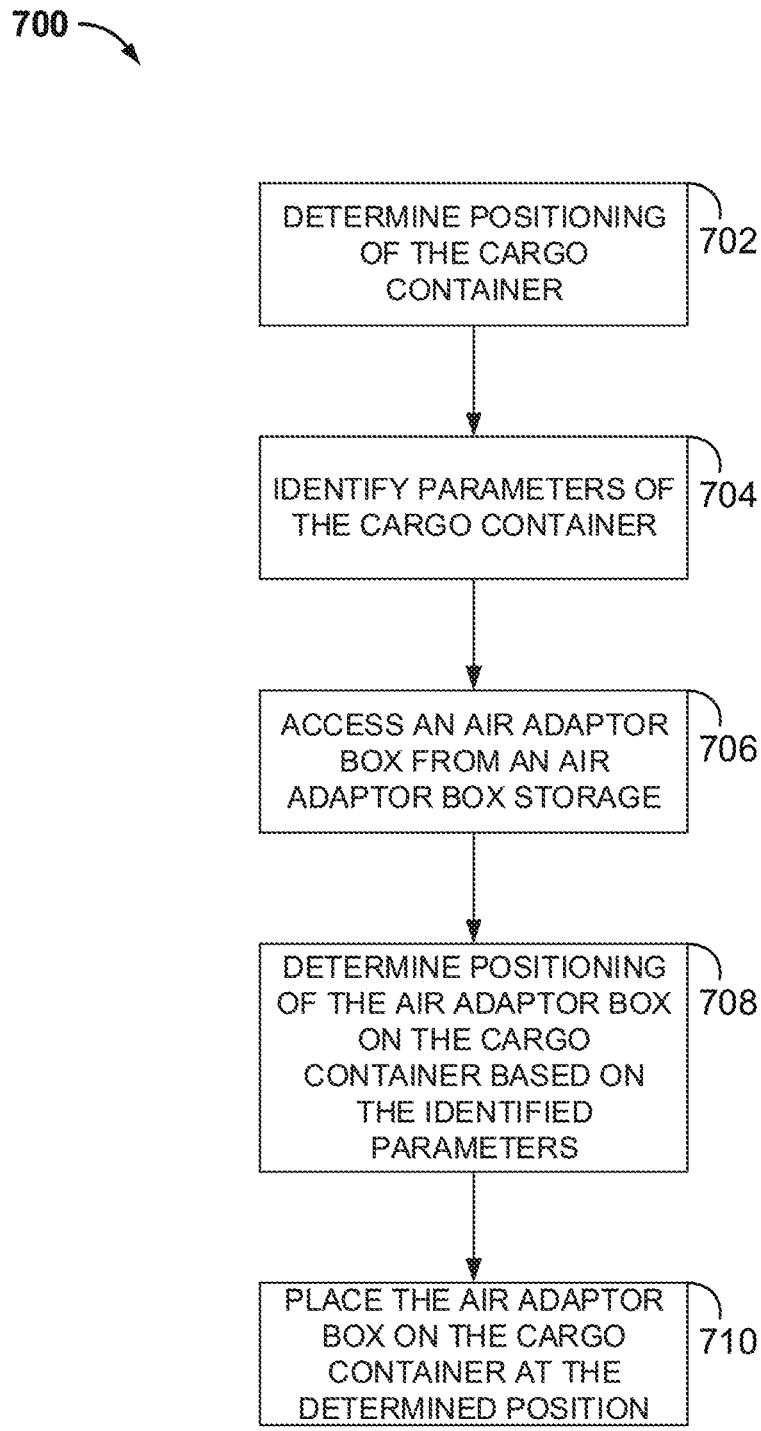
FIG. 7 is a flowchart for an exemplary method of placing the air adapter box of FIG. 3 on the cargo container of FIG. 1, in accordance with an exemplary implementation described herein.

FIG. 7 is a flowchart for an exemplary method 700 of placing the air adapter box 300 of FIG. 3 on the cargo container 110 of FIG. 1, in accordance with an exemplary implementation described herein. In some embodiments, the various blocks shown in the method 700 may be performed as part of an automated process that may be applied to each cargo container 110 received at the cargo facility 100 of FIG. 1. In some embodiments, one or more of the blocks shown may be omitted from or additional blocks may be added to the method 700 shown. In some embodiments, one or more blocks of the method 700 may be performed by the mounting system 400 or the adaptor placement gallows 401.

At block 702, a position of the cargo container 110 for use at the cargo facility 100 may be determined. In some embodiments, determining the position of the cargo container 110 may comprise determining that the cargo container 110 is positioned at a particular location with respect to one or more parameter measuring devices or sensors. In some embodiments, determining the position of the cargo container 110 may comprise determining that the cargo container 110 is positioned within a particular parking spot and so forth.

At block 704, various parameters of the cargo container 110 may be identified or measured. For example, the various parameters may include a width of the cargo container 110 and the height of the cargo container 110 and a height of one or more physical connections (for example, compressed air, electrical, and so forth) on the cargo container 110. In some embodiments, the various parameters may be obtained via one or more imaging devices, sensors, and so forth.

At block 706, an air adaptor box 300 may be obtained from the adaptor storage 420 (FIG. 4) location or device. In some embodiments, the air adaptor box 300 may be obtained by the mounting system 400 or the adaptor placement gallows 401. In some embodiments, obtaining the air adaptor box 300 may comprise placing the air adaptor box 300 on the adaptor placement gallows 401 (for example, via the air adaptor holder 408 or the box holder 410). In some embodiments, obtaining the air adaptor box 300 from the adaptor box storage 420 may comprise moving the air adaptor holder 408 and/or the box holder 410 to the adaptor box storage 420 and picking one of the air adaptor boxes 300 from the adaptor box storage 420 for placement on the adaptor placement gallows 401 via the air adaptor holder 408 and/or the box holder 410. In some embodiments, the adaptor placement gallows 401 may be maneuvered (for example, via height adjustments, extension adjustments, and so froth) to various positions or locations while the adaptor placement gallows 401 is holding the air adaptor box 300.

At block 708, a positioning of the air adaptor box 300 on the cargo container 110 may be determined. In some embodiments, the positioning of the air adaptor box 300 on the cargo container 110 may be determined at least in part on the parameters of the cargo container 110 determined at block 704. In some embodiments, the positioning of the air adaptor box 300 on the cargo container 110 may be determined so that the air adaptor box 300 is properly placed at a location on the cargo container 110 that is accessible to an automated system (for example, the air mechanism 200 (FIG. 2) on the on the autonomous transport vehicle 105.

At block 710, the air adaptor box 300 may be placed at the determined position (from block 708) on the cargo container 110. In some embodiments, the air adaptor box 300 may be placed on the cargo container 110 at the determined position by the gallows 401, which may rotate and raise/lower the air adaptor box 300 to an appropriate position and height to place the air adaptor box 300 at the determined position on the cargo container 110. In some embodiments, the gallows 401 may be positioned and configured to place the air adaptor box 300 at the determined position on a plurality of cargo containers 110 parked or positioned within reach or accessibility of the adaptor placement gallows. In some embodiments, placement of the air adaptor box 300 on the cargo container 110 may include the adaptor placement gallows 401 adjusting the air adaptor box 300 to adhere to or otherwise grip the cargo container 105. For example, the adaptor placement gallows 401 may cause the compression frame 302 (FIG. 3) and/or the lateral compression arms and pads 314 (FIG. 3) to compress against sides of the cargo container 110 such that the air adaptor box 300 maintains its position on the front face (FIG. 3) of the cargo container 110.

In some embodiments, one or more components of the adaptor placement gallows 401 may determine that the air adaptor box 300 is not appropriately positioned on the front face 216 of the cargo container 110. For example, in some embodiments, the one or more components of the adaptor placement gallows 401 (for example, a camera system) may determine that the air adaptor box 300 is upside down, or placed too high, too low, off center, not staying positioned, and so forth, on the front face 312 of the cargo container 110. In such circumstances, one or more alarms may be activated.

Once the air adaptor box 300 is positioned on the front face 312 of the cargo container 110, the cargo container 110 may be picked up by the autonomous transport vehicle 105. In some embodiments, when the autonomous transport vehicle 105 arrives to pick up the cargo container 110, the air mechanism 200 on the autonomous transport vehicle 105 may identify and determine a position of the air adaptor box 300 on the front face 312 of the cargo container 110. The air mechanism 200 may then couple to the air adaptor box 300 before the autonomous transport vehicle 105 can transport the cargo container 110, because the coupling of the air mechanism 200 and the air adaptor box 300 may provide for the air pressure and/or electrical connections needed to operate the cargo container 110 (for example, the brakes, lights, and so forth).

In some embodiments, when the cargo container 110 is being prepared to leave the cargo facility 100, the adaptor placement gallows 401 may be configured to remove the air adaptor box 300 from the front face 312 of the cargo container 110 and place the removed air adaptor box 300 back on the adaptor storage 420. In some embodiments, the process or method of removing the air adaptor box 300 may be substantially the reverse of the method 700.

Figure 8:
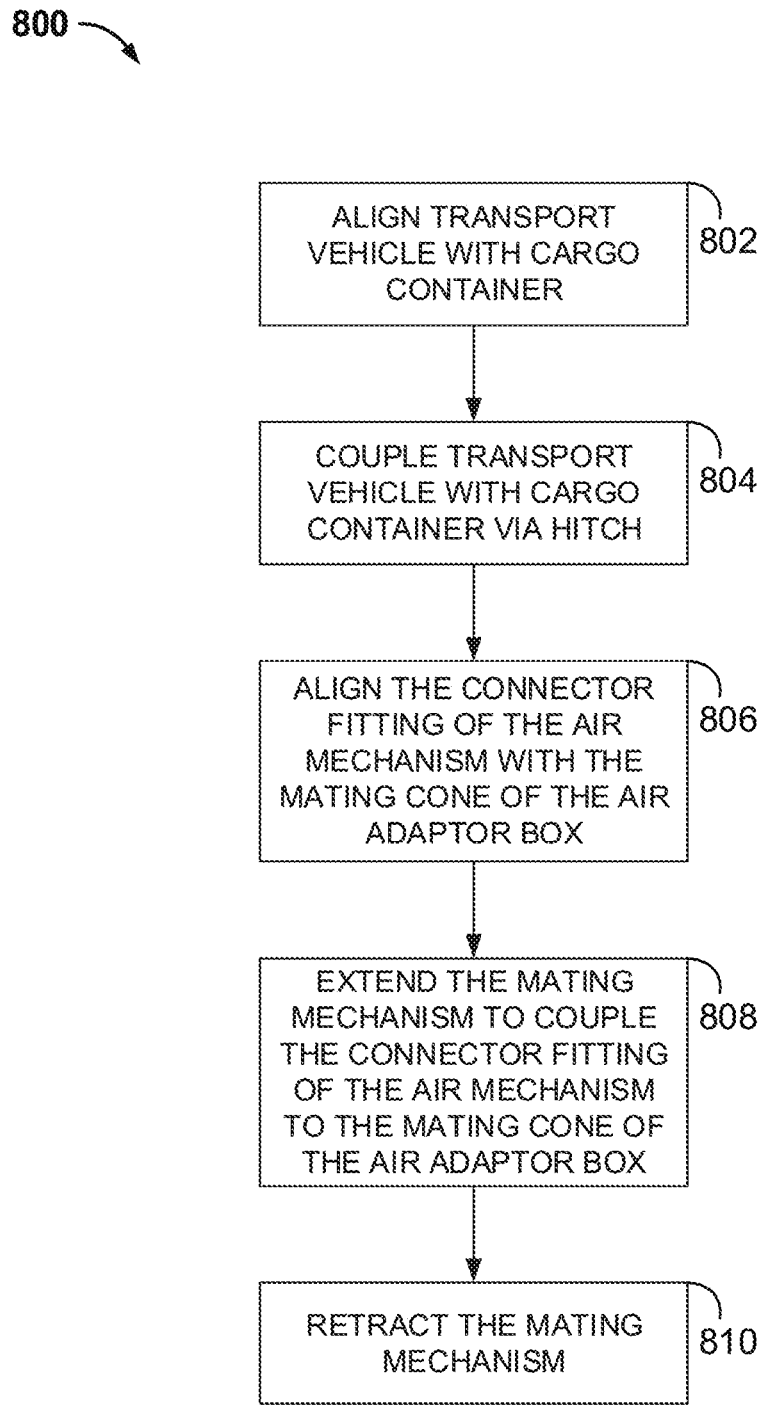
FIG. 8 is a flowchart for an exemplary method of coupling the air mechanism of FIG. 2 to the air adapter box of FIG. 3, in accordance with an exemplary implementation described herein.

FIG. 8 is a flowchart for an exemplary method 800 of coupling the air mechanism 200 of FIG. 2 to the air adapter box 300 of FIG. 3, in accordance with an exemplary implementation described herein. In some embodiments, the various blocks shown in the method 800 may be performed as part of an automated process that may be performed each time that the autonomous transport vehicle 105 couples to the cargo container 110 at the cargo facility 100 of FIG. 1. In some embodiments, one or more of the blocks shown may be omitted from or additional blocks may be added to the method 800 shown. In some embodiments, one or more blocks of the method 800 may be performed by the air mechanism 200 and/or the autonomous transport vehicle 105. In some embodiments, the air mechanism 200 and/or the autonomous transport vehicle 105 may be configured to decouple from the air adaptor box 300 positioned on the cargo container 110 when the autonomous transport vehicle 105 is dropping off or disconnect from the cargo container 110.

At block 802, the autonomous transport vehicle 105 may be aligned (or substantially aligned) with the cargo container 110. In some embodiments, the alignment of the autonomous transport vehicle 105 and the cargo container 110 may be determined by the camera 204 of the air mechanism 200. In some embodiments, the alignment of the autonomous transport vehicle 105 may be determined by one or more sensors of one of the autonomous transport vehicle 105 and/or the cargo container 110. In some embodiments, the alignment of the autonomous transport vehicle 105 with the cargo container 110 may be displayed on or in one of the autonomous transport vehicle 105, the cargo container 110, and/or an external display for monitoring by an external entity.

At block 804, the autonomous transport vehicle 105 may couple or hitch to the cargo container 110. In some embodiments, this may comprise physically connecting the cargo container 110 to the autonomous transport vehicle 105, for example, using the fork. In some embodiments, coupling or hitching the autonomous transport vehicle 105 to the cargo container 110 may allow for the autonomous transport vehicle 105 to move or transport the cargo container 110.

At block 806, the air mechanism 200 may be aligned with the air adaptor box 300. In some embodiments, the alignment of the air mechanism 200 with the air adaptor box 300 may be verified with the camera 204. In some embodiments, the camera 204 may determine whether the air adaptor box 300 is positioned within reach of the air mechanism 200. In some embodiments, the air mechanism 200 may be configured to move vertically or laterally to properly align with the air adaptor box 300. In some embodiments, if the air mechanism 200 is not and/or cannot be properly aligned, one or more alarms may be activated. In some embodiments, aligning the air mechanism 200 with the air adaptor box 300 may comprise ensuring (for example, via the camera 204) that the air adaptor box 300 is installed on the cargo container 110.

At block 808, the air mechanism 200 may extend the air adaptor 214 (FIG. 2) to mate with or couple to the mating recess 306 (FIG. 3) of the air adaptor box 300. In some embodiments, extension of the air adaptor 214 to the mating recess 306 may comprise utilizing the swing cage 206 to swing the air adaptor 214 (and associated components of the air mechanism 200) toward the mating recess 306 of the air adaptor box 300. In some embodiments, the air adaptor 214 may be coupled to a piston or similar actuator that replaces the swing cage 206. In some embodiments, the swing cage 206 and/or similar actuators may retract after extending the air adaptor 214 to the mating recess 306, leaving the air adaptor 206 coupled to the mating recess 306 and leaving the air hose 218 connecting the air adaptor 206 to the air mechanism, where the air hose 218 supplies air from the air mechanism 200 to the air adaptor box 300 via the air adaptor 214 and the mating recess 306. In some embodiments, the air adaptor 214 may be extended to the mating recess 306 via compressed air similar implementations. In some embodiments, the components of the air mechanism 200 may also be configured to create an electrical coupling between the autonomous transport vehicle 105 and the cargo container 110. For example, in some embodiments, the air connection between the air mechanism 200 and the air adaptor box 300 may include conductive connections. For example, one or more conductive connections on the air adaptor 214 may contact one or more conductive connections in the mating recess 306 to allow power and/or signals to be communicated electronically between the air mechanism 200 and the air adaptor box 300. In such embodiments, the air hose 218 may be conductive or otherwise include one or more wires to convey electrical power to the air adaptor box 300.

At block 810, the swing cage 206 and/or similar actuators may retract after extending the air adaptor 214 to the mating recess 306. After retracing the swing cage 206, the air adaptor 206 may remain coupled to the mating recess 306 with the air hose 218 connecting the air adaptor 206 to the air mechanism 200, where the air hose 218 supplies air (and, in some embodiments, electricity) from the air mechanism 200 to the air adaptor box 300 via the air adaptor 214 and the mating recess 306.

In some embodiments, one or more components of the air mechanism 200 may determine that the air adaptor 206 and the mating recess 306 are not appropriately coupled. For example, in some embodiments, the one or more components of the air mechanism 200 may determine that there is not proper air flow (or electricity flow) between the air mechanism 200 and the air adaptor box 300. In such circumstances, one or more alarms may be activated.

In some embodiments, when the cargo container 110 is being prepared to dropped at the destination dock, the air mechanism 200 may be configured to disconnect or decouple the air and/or electricity supply between the air mechanism 200 and the air adaptor box 300. In some embodiments, the process or method of disconnecting or decoupling the air adaptor box 300 and the air mechanism 200 may be substantially the reverse of the method 800.

In many embodiments, moving the cargo container 110 with the autonomous transport vehicle 105 once the autonomous transport vehicle has been hitched to cargo container 110 requires energizing the cargo container 110 air lines to release any associated braking mechanisms. For example, two separate connectors (standard and emergency) may be present on the front face 312 of each cargo container 110. Adding structure (e.g., the air adaptor box 300) at a central location on the cargo container 110 may enable automatic connection of the cargo container 110 air lines to the autonomous transport vehicle 105 air mechanism 200. In certain embodiments, special markings may be added to the cargo container 110 to assist in the automated application of the air adaptor box 300 to the cargo container 110 and loading, etc., of the cargo container 110. Similar boxes or mechanisms may be designed to simplify mating electrical and/or hydraulic connections between the autonomous transport vehicle 105 and the cargo container 110. The air mechanism 200 positioned on the autonomous transport vehicle 105 may be extendable to cover the distance between the autonomous transport vehicle 105 and the cargo container 110 when the autonomous transport vehicle 105 is coupled to the cargo container 110 via the fork. As described herein, the air mechanism 200 may mate with or couple to the air adaptor box 300. The air mechanism 200 may extend and retract to leave the air hose 218 disposed between the air mechanism 200 and the air adaptor box 300. In some embodiments, the air hose 218 may be flexible. The camera 204 may be integrated into the controller such that an operator could verify the coupling of the air mechanism 200 and the air adaptor box 300 or to assist in the automated coupling.

In some embodiments, the dispatch system may be configured to control and/or monitor the control systems of the air mechanism 200 and the adaptor placement gallows 401. In some embodiments, the dispatch system may be configured to cause the air mechanism 200 to perform one or more of the functions or blocks identified as part of the method 800. In some embodiments, the dispatch system may be configured to cause the adaptor placement gallows 401 to perform one or more of the functions or blocks identified as part of the method 700. In some embodiments, the dispatch system may be configured to monitor progress of the methods 700 and 800 and/or any alarms or indications that are generated as part of the methods 700 and 800.

Figure 9:
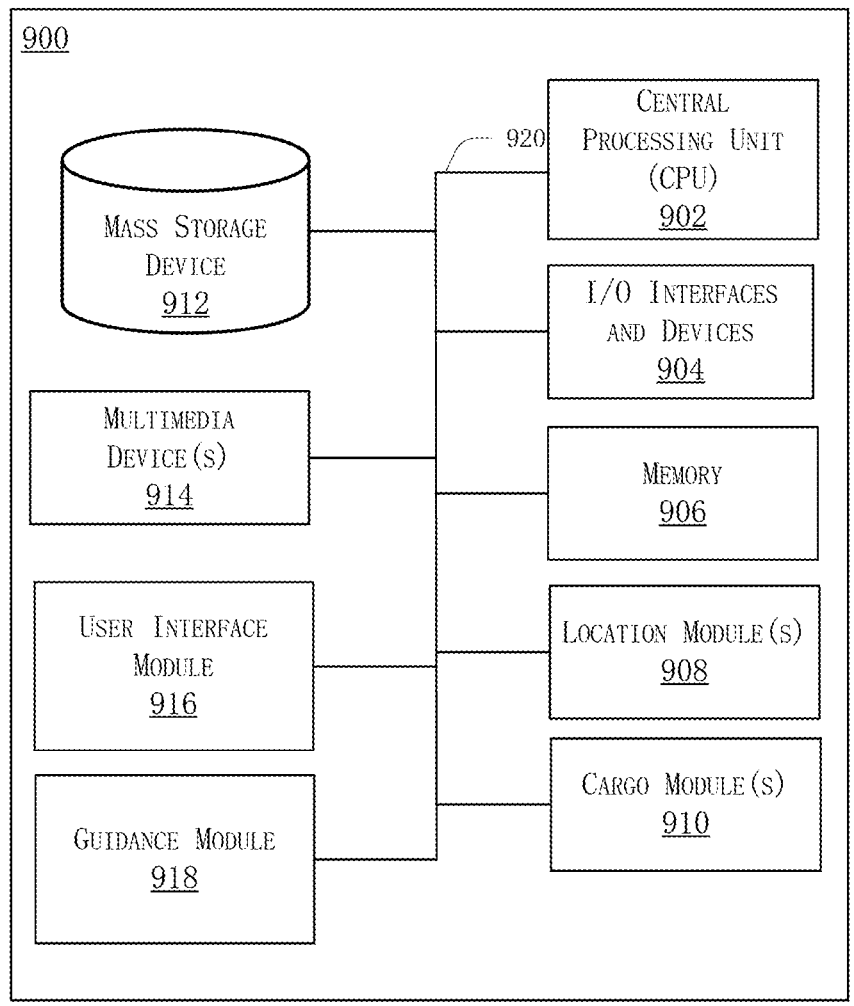
FIG. 9 depicts a block diagram of one embodiment of a system operating within each autonomous transport vehicle or the control system for the cargo facility, or a subsection thereof, that assists in coordinating transportation of cargo containers within the cargo facility.

FIG. 9 depicts a block diagram of one embodiment of a subsystem 900 operating within each autonomous transport vehicle 105 or the control system for the cargo facility 100, or a subsection thereof, that assists in coordinating transportation of cargo containers 110 within the cargo facility 100. In some embodiments, any component or entity of the cargo facility 100. Any autonomous transport vehicle 105, any cargo container 110, any system controller for the cargo facility control system (not shown) may comprise the module subsystem 900. In some embodiments, the autonomous transport vehicle 105, cargo container 110, or system controller for the cargo facility control system may comprise a single system embodied by the subsystem 900. For example, each autonomous transport vehicle 105 may comprise a control subsystem 900 that controls operation of that autonomous transport vehicle 105 and communications with the control subsystem 900 of another autonomous transport vehicle 105 or the control system of the cargo facility 100, and so forth. In some embodiments, the subsystem 900 (and any of the modules of the control system of the cargo facility 100) may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 9, one or more components of the control subsystem 900 may be modules, instances, and/or software that operate on the control subsystem 900. This, and other modules in the control system of the cargo facility 100, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. These components may be used to implement systems and methods described herein.

In some embodiments, the various modules described herein may be implemented by either hardware or software. In an embodiment, various software modules included in the control subsystem 900 may be stored on a component of the control subsystem 900 itself, or on computer readable storage media or other component separate from the control subsystem 900 and in communication with the control subsystem 900 via a network or other appropriate means.

The subsystem 900 (or any components or modules of the control system of the cargo facility 100) may comprise, for example, a computer that is IBM, Macintosh, or Linux/Unix compatible or a server or workstation. In some embodiments, the subsystem 900 comprises a smart phone, a personal digital assistant, a kiosk, a mobile computer, a built-in computer, or a media player. In some embodiments, the subsystem 900 may comprise more than one of these devices. In some embodiments, the subsystem 900 includes one or more central processing units ("CPUs" or processors) 902, I/O interfaces and devices 904, memory 906, a location module 908, a cargo module 910, a mass storage device 912, multimedia devices 914, the user interface module 916, a guidance module 918, and a bus 920.

The CPU 902 may control operation of the control subsystem 900. The CPU 902 may also be referred to as a processor. The processor 902 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The I/O interface 904 comprises a keypad, a microphone, a touchpad, a speaker, and/or a display, or any other commonly available input/output (I/O) devices and interfaces. The I/O interface 904 may include any element or component that conveys information to an operator or user of the control subsystem 900 or the cargo facility 100 and/or receives input from the operator or user. In one embodiment, the I/O interface 904 includes one or more display devices, such as a monitor, that allows the visual presentation of data to the consumer. More particularly, the display device provides for the presentation of GUIs, application software data, websites, web apps, and multimedia presentations, for example.

In some embodiments, the I/O interface 904 may provide a communication interface to various external devices. For example, control subsystem 900 is electronically coupled to the network, which comprises one or more of a LAN, WAN, and/or the Internet. Accordingly, the I/O interface 904 includes an interface allowing for communication with the network, for example, via a wired communication port, a wireless communication port, or combination thereof. The network may allow various computing devices and/or other electronic devices to communicate with each other via wired or wireless communication links. In some embodiments, the I/O interfaces 904 comprise a dispatch system (comprising a communication module) for the cargo facility control system or a communication module in one of the autonomous transport vehicles 105.

The memory 906, which includes one or both of read-only memory (ROM) and random access memory (RAM), may provide instructions and data to the processor 902. For example, inputs received by one or more components of the control subsystem 900 may be stored in the memory 906. A portion of the memory 906 may also include non-volatile random access memory (NVRAM). The processor 902 typically performs logical and arithmetic operations based on program instructions stored within the memory 906. The instructions in the memory 906 may be executable to implement the methods described herein. In some embodiments, the memory 906 may be configured as a database and may store information that is received via the user interface module 916 or the I/O interfaces and devices 904.

The control subsystem 900 also includes the location module(s) 908. In some embodiments, the location modules 908 may also be stored in the mass storage device 912 as executable software code that is executed by the processor 902. In the embodiment shown in FIG. 9, the control subsystem 900 may be configured to execute the location module 908 to obtain location updates (for example, from a positioning device, such as a GPS device, or other positioning systems, and so forth) for the autonomous transport vehicle 105 (when the control subsystem 900 is operating in the autonomous transport vehicle 105) or for all autonomous transport vehicles 105, all cargo containers 110, and any other tracked items (when the control subsystem is operating in the control system for the cargo facility 100).

In some embodiments, the location module 908 comprises the GPS or similar device. In some embodiments, the location module 908 provides or receives location updates to or from other devices via the I/O interfaces and devices 904. In some embodiments, the location module 908 may provide data used for or may assist in generating routes (for example, by the control system of the cargo facility 100 or the autonomous transport vehicle 105). In some embodiments, the location module 908 may provide data used for or may assist in generating transport plans, which may comprise details for where, how, and along which route or path the cargo container 110 should be moved in the cargo facility 100 (for example, using one or more autonomous transport vehicles, and/or may comprise details for all autonomous transport vehicles 105 and/or cargo containers 110 in the cargo facility 100 (for example, by the control system of the cargo facility 100 or the autonomous transport vehicle 105).

The control subsystem 900 also includes the cargo module 910. In some embodiments, the cargo modules 910 may also be stored in the mass storage device 912 as executable software code that is executed by the processor 902. In the embodiment shown in FIG. 9, the control subsystem 900 may be configured to execute the cargo module 910 to identify and/or track the cargo stored in a particular cargo container 110 or being transported by a particular autonomous transport vehicle 105. In some embodiments, the cargo module 910 tracks the cargo information for the current autonomous transport vehicle 105 (for example, when the control subsystem 900 is operating in the autonomous transport vehicle 105) or for all autonomous transport vehicles 105, all cargo containers 110, and any other tracked items (when the control subsystem 900 is operating in the control system for the cargo facility 100).

In some embodiments, the cargo module 910 comprises a storage location or stores the cargo information tracked in the mass storage device 912. In some embodiments, the cargo module 910 provides or receives cargo information updates to or from other devices via the I/O interfaces and devices 904. In some embodiments, the cargo module 910 comprises controls for one or more of the air mechanism 200, the mounting system 400, and so forth.

The control subsystem 900 may also include the mass storage device 912 for storing software or information (for example, data aggregated from one or more sources, cargo records, location records, cargo pickup/delivery records, cargo facility in/out records, location information, etc.). Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. The mass storage device 912 may comprise a hard drive, diskette, solid state drive, or optical media storage device. In some embodiment, the mass storage device 912 may comprise data aggregated and fused from operation and/or non-operational sources into a unified data model, including attributes from one or more of the address management system (AMS), national change of address (NCOA) system, informed visibility (IV), and product tracking and reporting (PTR). The AMS may provide information regarding valid addresses and classifiers about each residence and corresponding delivery. The PTS may record addresses and names on package labels, item labels, and so forth and calculates aggregate counts of packages (and/or items) delivered. The NCOA may record and count change of address requests/submissions, including new and old location information. The IV may record information regarding individual items and tracks counts by type the location area.

The control subsystem 900 also includes the user interface module 916. In some embodiments, the user interface module 916 may also be stored in the mass storage device 912 as executable software code that is executed by the processor 902. In the embodiment shown in FIG. 9, the subsystem 900 may be configured to execute the user interface module 916 to perform the various methods and/or processes as described herein. In some embodiments, the user interface module 916 provides a user or operator front end that ingests control inputs and outputs information associated with the control subsystem 900, for example destination information, and so forth.

The user interface module 916 may be configured to generate and/or operate user interfaces of various types. In some embodiments, the user interface module 916 constructs pages, applications ("apps") or displays to be displayed in a web browser, computer/mobile application, or human-machine interfaces. In some embodiments, the user interface module 916 may provide an application or similar module for download and operation. The pages or displays may, in some embodiments, be specific to a type of device, such as a mobile device or a desktop web browser, a built-in control system, and so forth, to maximize usability for the particular device. In some embodiments, the user interface module 916 may also interact with a client-side application, such as a mobile computing application (an "app") on a smartphone or a tablet computer, for example, a standalone desktop application, or user communication accounts (e.g., e-mail, SMS messaging, etc.) and provide data as necessary to display corresponding information.

The subsystem 900 also includes the guidance module 918. In some embodiments, the guidance module 918 may also be stored in the mass storage device 912 as executable software code that is executed by the processor 902. In the embodiment shown in FIG. 9, the subsystem 900 may be configured to execute the guidance module 918 to perform guidance of the autonomous transport vehicles 105 around the cargo facility 100. In some embodiments, the guidance module 918 may include or utilize one or more control systems used to control the autonomous transport vehicles 105, the mounting system 400, or the air mechanism, and so forth. In some embodiments, the guidance module 918 may enable the corresponding hardware to operate as described herein.

In some embodiments, the communications with the subsystem 900 may be specially formatted to be simultaneously communicated via multiple communications methods and/or formats (e.g., text, e-mail, call, mail, etc.).

The bus 920 may electrically and/or physically connect the components of the subsystem 900 to enable communication between the components.

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope. 1001071A person skilled in the art will recognize that each of these sub-systems may be interconnected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C #), or Java, and ran under a conventional operating system. C, C++, BASIC, Pascal, Java, and FOR-TRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following materials may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A system for transporting a cargo container comprising:
a dispatch system comprising a communication module;
an autonomous transport vehicle, the autonomous transport vehicle comprising:
  a processor configured to control movement of the autonomous transport vehicle;
  a location circuit configured to determine the location of the autonomous transport vehicle at a facility; and
  a communication circuit configured to receive movement instructions from the communication module;
a mounting system configured to attach an air adaptor box to a cargo container, the mounting system comprising an adaptor placement gallows;
wherein the processor of the autonomous transport vehicle is configured to:
  control the autonomous transport vehicle to move the autonomous transport vehicle to the cargo container;
  control the autonomous transport vehicle to connect the autonomous transport vehicle to the air adaptor box attached to the cargo container; and
  cause the autonomous transport vehicle to move the cargo container to a dock at a facility based on instructions from the dispatch system.

2. The system of claim 1, wherein the dispatch system comprises a processor configured to:
identify a location of the cargo container; and
generate a route between the location of the cargo container and the dock at the facility.

3. The system of claim 1, wherein the dispatch system comprises a processor configured to:
coordinate an arrival of the cargo container at the facility; and
cause the mounting system to attach the air adapter box to the cargo container without human intervention.

4. The system of claim 1, wherein the dispatch system comprises a processor configured to:
coordinate an arrival of the cargo container at the facility; and
attach the air adapter box to the cargo container without human intervention.

5. The system of claim 1, wherein the dispatch system comprises a processor configured to generate a transport plan for transporting a plurality of cargo containers at the facility, the plurality of cargo containers including the cargo container, using a plurality of autonomous transport vehicles, the plurality of autonomous transport vehicles including the autonomous transport vehicle.

6. The system of claim 1, wherein the mounting system further comprises a sensor to determine a dimension of the cargo container.

7. The system of claim 6, wherein the air adapter box comprises one or more compression arms to make contact with one or more sides of the cargo container.

8. The system of claim 7, wherein the one or more compression arms of the air adapter box are configured to be adjusted based on the sensed dimension of the cargo container.

9. The system of claim 1, wherein the dispatch system comprises a sensor configured to determine whether the cargo container at a facility has an air adapter box disposed thereon.

10. The system of claim 1, wherein the mounting system further comprises an adaptor storage unit storing a plurality of air adaptor boxes proximate the adaptor placement gallows.

11. A method of transporting cargo containers, the method comprising:
determining, by a processor, the location of an autonomous transport vehicle at a facility;
determining, by a sensor, the location of a cargo container;
attaching, via a mounting system comprising an adaptor placement gallows, an air adaptor box to the cargo container;
receiving, from a processor, movement instructions from the communication module;
moving the autonomous transport vehicle to the cargo container;
connecting the autonomous transport vehicle to the air adaptor box attached to the cargo container; and
transporting the cargo container to a dock at a facility based on instructions from a dispatch system.

* * * * *